United States Patent [19]

Spector

[11] Patent Number: 5,117,249

[45] Date of Patent: May 26, 1992

[54] SHADOWLESS BACKGROUND FOR PHOTOGRAPHY

[76] Inventor: Donald Spector, 380 Mountain Rd., Union City, N.J. 07087

[21] Appl. No.: 701,022

[22] Filed: May 16, 1991

[51] Int. Cl.$^5$ ............................................. G03B 15/00
[52] U.S. Cl. ...................................... 354/291; 352/88; 358/901
[58] Field of Search .................. 354/291, 290; 352/88; 350/96.1, 96.2, 96.24, 96.23, 96.25; 358/901

[56] References Cited

U.S. PATENT DOCUMENTS

| | | | |
|---|---|---|---|
| 3,397,022 | 8/1968 | Cole | 350/96.25 |
| 4,872,031 | 10/1989 | Baliozian | 354/291 |
| 5,029,975 | 7/1991 | Pease | 350/96.25 |

*Primary Examiner*—W. B. Perkey
*Assistant Examiner*—Cassandra C. Spyrou
*Attorney, Agent, or Firm*—Michael Ebert

[57] ABSTRACT

A shadowless background board for photography, a subject to be photographed being placed in front of the board and being illuminated by light rays directed toward the board. The shadow cast on the board by the subject creates thereon a shadow zone bordered or surrounded by an illuminated region. The board is constituted by a translucent light-diffusing front panel behind which is a light distributor responsive to light rays inmpinging on the illuminated region on the panel and adapted to convey these rays to the shadow zone and thereby illuminate this zone. The light distributor is in the form of a light-conducting circuit matrix having a network of light-conducting lines, either end of each line functioning as a light input to the line or as an output therefore. The ends of the lines engage respective sites on an array thereof that is uniformly distributed throughout the rear surface of the translucent panel. The circuit arrangement is such that those light rays incident to sites lying within the illuminated region of the panel are picked up by line ends engaging these sites and are conveyed by the related lines to ends engaging sites lying within the shadow zone, thereby illuminating this zone and eliminating the shadow whereby the photograph taken of the subject is shadow free.

6 Claims, 1 Drawing Sheet

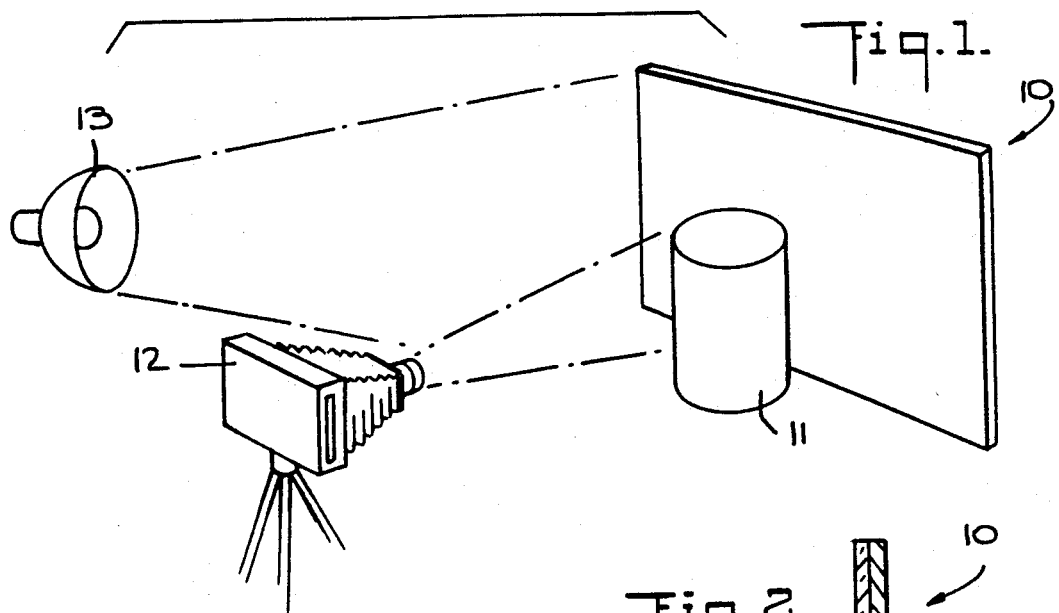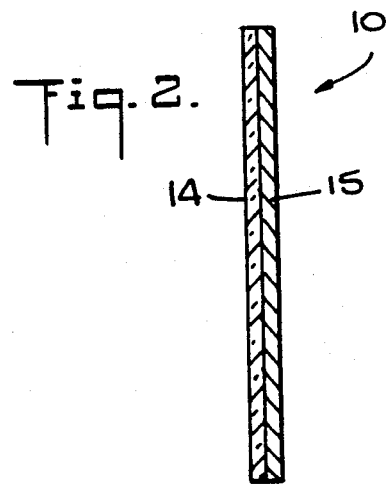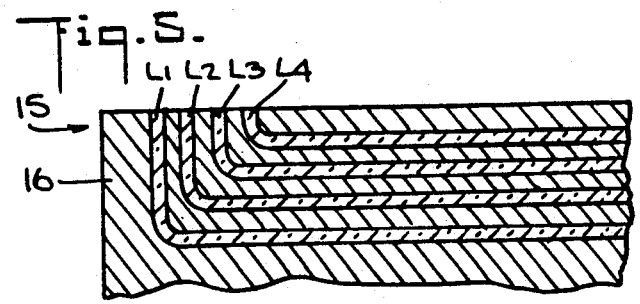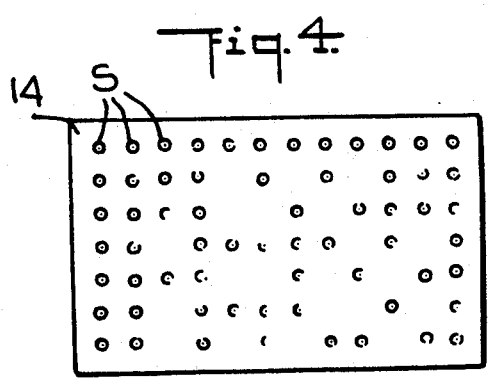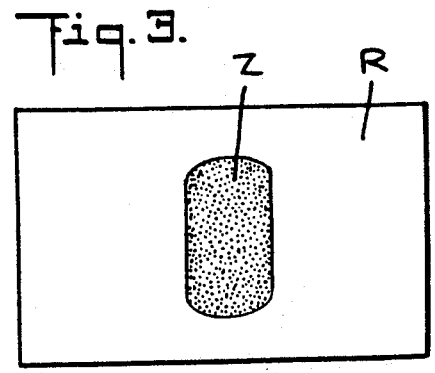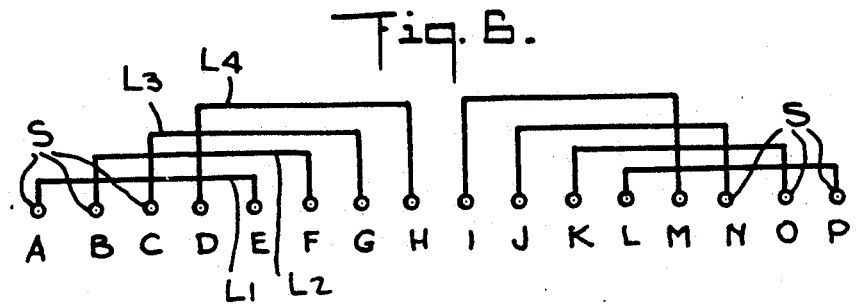

SHADOWLESS BACKGROUND FOR PHOTOGRAPHY

BACKGROUND OF INVENTION

1. Field of Invention

This invention relates generally to background boards for use in photography to provide a neutral background for a three-dimensional subject being photographed, and more particularly to a shadowless background board adapted to effectively erase the shadow cast by the subject on the board so that the resultant photograph is shadow free.

2. Status of Prior Art

When photographing a three-dimensional subject, such as a manufactured product which is to be illustrated in a catalog or included in an advertisement, it is the usual practice to place the subject in front of a background board. In this way, the photograph illustrates the product against a neutral background and the viewer of the illustrated product sees only the product without any extraneous or distracting details.

In a typical studio set-up, in order to properly illuminate the subject to be photographed, the lighting system is arranged to direct light rays toward the background board, these rays being intercepted by the subject placed in front of the board, as a consequence of which a shadow is cast on the board by the subject. The shadow, or a portion thereof, appears on the film negative, this depending on the angle at which the picture is taken.

Since it is important that the photographed subject be seen by the viewer free of all extraneous detail, it is the usual practice to strip out the shadow from the film negative. Such stripping is a time-consuming and relatively costly procedure. It must be carried out carefully to be sure that in doing so, the illustration of the product itself is in no way altered.

The Germond U.S. Pat. No. 4,740,805 points out that it is common in medical and dental practice to take a picture of a patient before and after treatment so as to make of record the results of treatment. It is essential that shadows be eliminated from the photographic images, for these shadows are distracting and may mislead the viewer and thereby impair the accuracy of the record.

In order to produce shadowless photographs, Germond provides a concave background screen. The patient to be photographed is placed in front of the screen, and his picture is taken by a camera equipped with an electronic flash unit. Mounted at the upper end of the concave screen is a slave electronic flash unit, and operatively associated with this unit is a photoelectric sensor which when exposed to a strong light acts to trigger the slave unit. When, therefore, the camera flash unit is activated to take a picture of the patient, light from the camera flash unit is picked up by the sensor, thereby triggering the slave unit which serves to illuminate the screen and thereby eliminate the shadow thereon.

Apart from the fact that the Germond background screen requires for its operation a slave flash unit and an associated light sensor to trigger this unit, is the further requirement that the camera taking the picture be provided with its own flash unit. The utility of Germond's background screen is therefore limited and cannot be used in professional or studio photography when the subject to be photographed is illuminated by a high-intensity lighting system not of the flash type.

In this professional lighting arrangement, because the high-intensity lighting is continuous, the placement of lights relative to the subject to be photographed can be adjusted by the photographer to attain desired effects and to highlight particular features of the subject. This cannot be done with a flash unit physically coupled to the camera and whose orientation is determined by the camera's placement.

SUMMARY OF INVENTION

In view of the foregoing, the main object of this invention is to provide a shadowless background board for photography that makes it possible to take shadow-free pictures of a three-dimensional subject placed before the board.

A significant feature of the invention is that the background board is passive and makes no use of electronic or other equipment, the board being responsive to light incident thereto to eliminate any shadow cast thereon by the subject being photographed.

More particularly, an object of this invention is to provide a shadowless background board for photography that incorporates light-conductive lines for exploiting light incident to one portion of the board in order to illuminate another portion that has a shadow cast thereon.

Also an object of the invention is to provide a board of the above type that can be mass produced at relatively low cost.

Briefly stated, these objects are attained in a shadowless background board for photography, a subject to be photographed being placed in front of the board and being illuminated by light rays directed toward the board. The shadow cast on the board by the subject creates thereon a shadow zone bordered or surrounded by an illuminated region.

The board is constituted by a translucent light-diffusing front panel behind which is a light distributor responsive to light rays impinging on the illuminated region on the panel and adapted to convey these rays to the shadow zone and thereby illuminate this zone. The light distributor is in the form of a light-conducting circuit matrix having a network of light-conducting lines, either end of each line functioning as a light input to the line or as an output therefor. The ends of the lines engage respective sites on an array thereof that is uniformly distributed throughout the rear surface of the translucent panel. The circuit arrangement is such that those light rays incident to sites lying within the illuminated region of the panel are picked up by line ends engaging these sites and are conveyed by the related lines to ends engaging sites lying within the shadow zone, thereby illuminating this zone and eliminating the shadow whereby the photograph taken of the subject is shadow free.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates schematically a studio arrangement for photographing a subject placed on front of a background board in accordance with the invention;

FIG. 2 is an end view of the board;

FIG. 3 is a front view of the board showing the shadow cast thereon by the subject being photographed;

FIG. 4 is a rear view of the translucent front panel of the board, showing an array of sites thereon which are engaged by the ends of light conducting-lines in the circuit included in the light distributor joined to the rear of the front panel;

FIG. 5 is a sectional view illustrating a portion of the light distributor; and

FIG. 6 shows some of the line connections between the light distributor circuit and the sites on the rear of the front panel.

DESCRIPTION OF INVENTION

Referring now to FIGS. 1 and 2, there is shown a rectangular background board, generally designated by numeral 10, in accordance with the invention. Placed in front of the board is a three-dimensional subject 11 to be photographed by a camera 12. The subject is illuminated by high-intensity lighting equipment 13, the light rays emitted from this equipment being directed toward board 10.

Board 10 is constituted by a front translucent panel 14 behind which and joined thereto is a light distributor 15. Panel 14 is formed of glass or acrylic material that is frosted or otherwise processed to impart light diffusing properties thereto, so that the panel acts to break up and scatter incident light. If, therefore, a sharp light beam having a circular cross section strikes the panel, the light will be spread out and not confined to a small circle on the panel.

When subject 11 is illuminated, since it acts to block the light, it then casts a shadow on panel 14 to create a shadow zone Z, as shown in FIG. 3. This zone is bordered or surrounded by a region R that is illuminated by light rays directed thereto by light source 13.

Light distributor 15 is responsive to the light rays impinging on and illuminating region R, and is adapted to convey these rays to shadow zone Z and thereby illuminate this zone to wipe out the shadow.

Light distributor 15 takes the form of a matrix having a network of light conducting lines embedded therein, either end of each line functioning as a light input to the line or as a light output. If, therefore, light rays impinge on one end of the line, this end will act as an input to this line which conveys the light to the other end from which it is emitted, the other end now acting as the output of the line. But if the incoming light is applied to the other end, it then acts as the input to the line.

The light conductive lines which are molded or extruded of acrylic or other transparent plastic material operate on fiber optics or light pipe principles.

One can transmit light from one end of a long glass cylinder to the other without leakage, provided that the light strikes the wall of the cylinder with an angle of incidence greater than the critical angle for total internal reflection. In transmission, light travels through the cylinder in a zig-zag path of successive internal reflections. To convey light without reflection loss, it is necessary that the angle of incidence A exceed the critical angle as expressed by the equation $\sin A = N_2/N_1$; where $N_1$ is the refractive index of the transmission material and $N_2$ that of the outer medium which in the case of a glass cylinder is air.

It is also possible to guide light through a synthetic plastic line formed of acrylic or other transparent plastic material, for the index of refraction of this material relative to that of air or another material having a different refractive index results in internal reflection.

The light conductive lines of light distributor 15 are formed, as shown in FIG. 5, by lines $L_1$, $L_2$, $L_3$, etc., running through a matrix block 16. The lines are formed of clear acrylic material and matrix block 16 is fabricated of a plastic material such as opaque PVC having a different index of refraction to cause internal reflection to take place in the lines.

The input-output ends of the lines which constitute the light distributor circuit engage respective sites S in a rectangular array of such sites uniformly distributed throughout the rear surface of panel 14, as shown in FIG. 4. The circles shown in FIG. 4 which represent sites S are imaginary and merely indicate the points at which the line ends engage the panels.

The line connections of the circuit are such as to interconnect panel sites S lying within the central area of the panel with panel sites lying within the left and right outer areas of the panel. Thus as shown in FIG. 6, assuming that one horizontal row of sites in the rectangular array is formed by a series of sixteen sites A to P, then the connections of the light conducting lines L are such as to connect the left outer area sites A, B, C and D to the left side sites E, F, G and H, respectively, in the central area, and to connect the right outer area sites M, N, O and P to the right side sites I, J, K and L, respectively, in the central area. A line connection is made between two sites when one end of a line engages one site and the other end engages the other site.

In practice, the shadow zone is most likely to fall within the central area of the panel, while the illuminated region lies largely within the left and right outer areas. Hence, light striking the outer areas is picked up by the ends of the lines lying within these areas and conveyed by the lines to the darkened central area to illuminate this area and thereby erase the shadow.

While the circuit arrangement in a given shadow situation may be such as to deliver more light to one part of the shadow zone than to another, because of the light spreading properties of the light diffusing panel, the light is not concentrated but is dispersed on the panel. Thus what the camera sees in taking a photograph is a shadow-free illuminated background board, and the fact that some portions of the illuminated board may be somewhat brighter than other portions does not show up in the photograph, for these differences in brightness appear as imperceptible gradations of white.

While there has been shown and described a preferred embodiment of a shadowless background board for photography in accordance with the invention, it will be appreciated that many changes may be made therein without, however, departing from the essential spirit thereof.

I claim:

1. A shadowless background board for use in producing a photograph of a subject, the subject to be photographed being placed before the board and being illuminated by light rays directed toward the board, said board comprising:

(a) a translucent front panel on which a shadow is cast by the illuminated subject to create on a panel a shadow zone surrounded by an illumination region;

(b) a light distributor joined to the rear of the panel and responsive to light rays impinging on the illuminated region and adapted to convey these rays to the shadow zone to illuminate this zone and erase the shadow, whereby the resultant photograph of the subject is shadow free, said light distributor including light conducting lines to convey the rays.

2. A board as set forth in claim 1, wherein said panel has light diffusing properties.

3. A board as set forth in claim 2, wherein said panel is formed of frosted acrylic material.

4. A board as set forth in claim 1, wherein said light distributor is in the form of a light conducting circuit matrix having a network of light conducting lines, either end of each line functioning as a light input to the line or as a light output, the ends of the lines engaging respective sites in an array thereof uniformly distributed throughout the rear surface of the panel.

5. A board as set forth in claim 4, in which the circuit arrangement is such that light incident to sites lying within the illuminated region are picked up by line ends engaging these sites and are conveyed by the related lines to line ends engaging sites lying within the shadow zone.

6. A board as set forth in claim 4, wherein said lines are formed of acrylic material embedded in a matrix having a different index of refraction.

* * * * *